United States Patent [19]

Gruber et al.

[11] Patent Number: 4,716,026

[45] Date of Patent: Dec. 29, 1987

[54] DEFLUORINATION KILN RESTRICTION CONTROL AGENT AND METHOD

[75] Inventors: James R. Gruber, Lakeland; Ernest A. Gudath, Brandon; Dennis H. Michalski, Lakeland; Robert R. Riddle, Lakeland; Regis R. Stana, Lakeland, all of Fla.

[73] Assignee: International Minerals & Chemical Corp., Terre Haute, Ind.

[21] Appl. No.: 820,503

[22] Filed: Jan. 22, 1986

[51] Int. Cl.⁴ .............................................. C01B 25/16
[52] U.S. Cl. ....................................... 423/167; 426/74
[58] Field of Search ...................... 423/167, 319, 320

[56] References Cited

U.S. PATENT DOCUMENTS

| | | | |
|---|---|---|---|
| 2,234,511 | 3/1941 | Wight et al. | 423/167 |
| 2,248,515 | 7/1941 | Shoeld | 423/167 |
| 2,360,197 | 10/1944 | Butt | 71/40 |
| 2,442,969 | 6/1948 | Butt | 71/40 |
| 2,478,200 | 8/1949 | Maust et al. | 423/167 |
| 2,565,351 | 8/1951 | Butt | 423/167 |
| 2,792,286 | 5/1957 | Wordie et al. | 423/313 |
| 2,893,834 | 7/1959 | Richardson | 423/167 |
| 2,997,367 | 8/1961 | Williams | 423/167 |
| 3,058,804 | 10/1962 | Tynan | 423/167 |
| 3,101,999 | 8/1963 | Malley et al. | 423/167 |
| 3,102,000 | 8/1963 | Malley et al. | 423/167 |
| 3,189,433 | 6/1965 | Hollingsworth et al. | 423/167 |
| 3,292,995 | 12/1966 | Allen | 423/167 |
| 3,851,086 | 11/1974 | Baumann | 423/167 |
| 3,907,538 | 9/1975 | Hauschild | 423/167 |
| 4,152,398 | 5/1979 | Larson | 423/167 |
| 4,239,523 | 12/1980 | Spada | 423/167 |
| 4,402,923 | 9/1963 | Lang | 423/167 |
| 4,423,015 | 12/1983 | Roy, Jr. et al. | 423/167 |

Primary Examiner—John Doll
Assistant Examiner—Wayne A. Langel
Attorney, Agent, or Firm—Robert H. Dewey; Thomas L. Farquer

[57] ABSTRACT

An improved process for the thermal defluorination of phosphate rock is provided. The process comprises adding ammonia to the phosphoric acid fed to the kiln, the amount of ammonia added being effective for forming a eutectic with the fused ring and ball materials and heating the mixture with agitation to defluorinating temperatures for a period of time sufficient to defluorinate the rock and recovering the defluorinated rock.

7 Claims, 2 Drawing Figures

DEFLUORINATION KILN RESTRICTION CONTROL AGENT AND METHOD

BACKGROUND OF THE INVENTION

1. Field of the Invention

This invention relates to an improved process for defluorination of phosphate rock. More specifically, this invention relates to an agent and method for controlling kiln restriction during thermal defluorination of phosphate rock.

2. Description of the Prior Art

The invention is of particular value in producing animal feed ingredients from mineral phosphates which usually occur in the form of apatite or fluorapatite. The more important natural deposits of mineral phosphates in the United States contain the desirable constitutents calcium and phosphorus in the form of apatite or fluorapatite, the formula of which may be written as $3Ca_3(PO_4)_2$—$CaF_2$ or $Ca_{10}F_2(PO_4)_6$ or $4CaO.P_2O_5.F_2$. According to these formulae the phosphate rock, if composed wholly of fluorapatite, contains about 3.77% fluorine. Concentrated Tennessee brown rock contains between about 3.0 and about 3.5% fluorine. On the other hand, Florida pebble phosphate rock contains about 3.8% fluorine.

The amounts of combined fluorine in these various mineral phosphate rocks are so high that if fed to animals in their original mined form would produce deleterious effects. Since the fluorine has been found to be deleterious particularly to cattle, it is necessary that this fluorine be substantially removed from the phosphate rock prior to its use as an animal feed supplement. It has been found that a phosphorus:fluorine weight ratio of greater than 100 in a phosphate feed supplement containing at least about 30% of $P_2O_5$ is considered acceptable at the present time.

In the past, animal feeds have been manufactured by mixing phosphate rock, "wet process" phosphoric acid and soda ash and allowing them to react. Typically, in the manufacture of phosphoric acid by the so-called "wet process", phosphate rock is treated with sulfuric acid. The calcium is precipitated as calcium sulfate and some, but not all, of the fluorine is volatilized as fluosilicic acid. Because of the residual fluorine, which is difficult to separate, the resulting phosphoric acid is a poor starting point for preparing mono- and dicalcium phosphates for use in animal feeds.

One well known practice for preparing mono- and dicalcium phosphate for use in animal feeds is to calcine the phosphate rock prior to reaction with the sulfuric acid. This is carried out by heating the comminuted phosphate rock to a temperature of about 1100°–3000° F. for a period of time sufficient to volatilize the fluorine.

E. H. Wight et al., U.S. Pat. No. 2,234,511 discloses a defluorination process wherein grannular superphosphate is fed into an inclined rotary kiln. Hot gases pass upwardly from a burner positioned at the lower end of the kiln thereby calcining (600°–800° C.) the superphosphate and substantially completely removing the fluorine.

The calcining is conveniently carried out in a rotary kiln. However, the process suffers from the disadvantage of solid phase component formation due to high temperature fusion. These components deposit on the kiln walls in the form of rings which effectively reduce the inner diameter of the kiln. When the rings become sufficiently thick, large balls of fused material may be unable to pass through the kiln. These deposits are known as "ring and ball materials" which not only impede kiln draft but can also drastically alter the thermal profile within the kiln. Eventually the kiln must be shut down, cooled and cleaned mechanically, all of which interferes with efficient production and increases costs.

Accordingly, there is a need for an improved thermal defluorination process whereby the formation and deposit of ring and ball materials are substantially eliminated, or whereby they can be removed from the kiln without interrupting the process.

C. A. Butt in U.S. Pat. No. 2,360,197 discloses a process for defluorinating triple superphosphate (impure monocalcium phosphate) which avoids build-up of ball and ring materials. Butt discloses adding a basic alkaline earth compound such as limestone, dolomite, hydrated lime or calcium oxide before calcining at a temperature of 875°–900° C.

C. A. Butt in U.S. Pat. No. 2,442,969, discloses a process for defluorination of ground natural phosphate rock by calcining at about 1450° C. Butt discloses adding MgO, $Na_2O$, and $K_2O$ to ground natural phosphate rock and calcining at 1100°–1300° C. Butt also discloses adding $H_3PO_4$, calcium monophosphate, dicalcium phosphate or other non-basic phosphate compounds.

In U.S. Pat. No. 2,565,351, Butt discloses another process wherein $H_3PO_4$ or another phosphate material, and sulfuric acid are added before calcining at 1275°–1450° C.

Wm. B. Williams in U.S. Pat. No. 2,997,367 teaches the addition of oxygen bearing calcium or alkali metal salts such as soda ash, sodium sulfate, sodium nitrate, sodium formate, sodium chloride, potassium carbonate, potassium sulfate, lime, limestone, calcium nitrate, and calcium formate to the phosphate rock prior to calcining in order to reduce fluorine content. Williams further discloses calcining in two stages: at 1800°–2700° F. (982°–1482° C.) then at 2700°–3000° F. (1482°–1649° C.).

D. E. Tynan in U.S. Pat. No. 3,058,804 teaches mixing an acid-reacting sodium phosphate salt with phosphate rock. Alkali metal salts to be added include $Na_2CO_3$, $Na_2SO_4$, $NaNO_3$, $NaOOC$, $NaCl$, $K_2CO_3$, and $K_2SO_4$. Tynan calcines at 1250° to 1450° C.

O. W. Allen, in U.S. Pat. No. 3,292,995, reduces balling by adding sufficient $CaCO_3$ to the calciner feed to neutralize free $H_2SO_4$. Allen calcines at 2500°–2800° F. (1371°–1538° C.).

A. N. Baumann, U.S. Pat. No. 3,851,086, adds $CaCO_3$ or $NaOH$ to the calciner feed based on triple superphosphate. Other suitable additives include Na, K and Li carbonates, sulfates, hydroxides and halides. Calcium compounds include limestone, hydrated lime, quicklime and calcium sulfate.

U.S. Pat. No. 4,239,523 to Spada discloses a process for making fertilizers rich in calcium orthophosphate. Calcium phosphate bearing minerals are reacted with ammonium biphosphate prior to being fed into a rotary furnace, wherein the materials react to form calcium orthophosphate.

U.S. Pat. No. 4,152,398 to Larson discloses the addition of sodium carbonate, sodium phosphate, sodium nitrate, sodium formate, sodium chloride and/or acidic sodium salts of phosphoric acid in order to prevent fusion of the phosphate rock in the defluorination calcination process.

U.S. Pat. Nos. 3,101,999 and 3,102,000 to Malley et al. disclose the addition of clay, talc ($Mg_3Si_4O_{10}(OH)_2$) or diatomacious earth to prevent agglomeration during defluorination calcining.

U.S. Pat. No. 2,478,200 to Maust et al. discloses the addition of aluminum phosphate as a catalyst promoting defluorination of phosphate rock having a low silica content (less than 4%). The low silica content assures no fusion or agglomeration in the calcining kiln.

U.S. Pat. No. 3,907,538 to Hauschild discloses the addition of magnesium compounds, such as magnesium carbonate, magnesium hydroxide and magnesium silicate, prior to calcination defluorination in order to prevent fusion and agglomeration build up on the calcining kiln walls.

There have been further attempts by those skilled in the art to flush defluorination kiln restrictions with the addition of orthophosphate salts, and more specifically, mono-ammonium orthophosphate salts, to the kiln feed as shown in FIG. 1. The orthophosphate salts provide cationically stabilized sources of phosphorus in high concentrations. The phosphorus enters into reaction with the kiln charge at the same temperature that fusion of solid phase compounds begins to take place. Phosphorus, which is volatilized during calcination of the charge, is replaced by condensed orthophosphates. The addition of the orthophosphate salts directly to the kiln hinders, and in some cases reverses, the fusion reaction, resulting in flushing or "shelling out" of wall build-up and dissolving of balls.

SUMMARY OF THE INVENTION

It is an object of this invention to provide an improved process for defluorination of phosphate rock.

It is another object of the invention to provide an improved process for thermal defluorination of phosphate rock.

It is still another object of this invention to provide a method for substantially eliminating formation of ring and ball materials during thermal defluorination of phosphate rock.

In the prior art, the mixing operation where phosphoric acid, an alkali-containing fluxing agent such as soda ash and phosphate rock are blended together had several problems peculiar to this type of process which later caused difficulties in the kiln operation. For example, the product from the mixer was almost always non-homogenous as evidenced by lumps and stratifications on the feed storage pile. These deviations impair kiln operation. Thus, it is an object of the present invention to provide means of enhancing the efficiency and productivity of the mixing step in the manufacture of defluorinated phosphate rock. It is a further object of the present invention to improve the control of the chemical ratios in this process by reducing nonhomogeneity of the kiln feed and by reducing the segregation of the feed on the storage pile.

The present invention is an improvement over earlier prior art procedures which teach adding extra phosphoric acid to accomplish similar objectives. The chief difficulty with the addition of extra phosphoric acid is that the phosphoric acid reacts with the feed components during the feed preparation and storage steps, leaving less phosphoric acid available to react in the kiln during calcinating when it is needed. Also, excess phosphoric acid has a tendency to volatilize or otherwise be driven off from the kiln and to be lost during the calcinating step. The present invention overcomes these obstacles by causing the phosphoric acid to remain in the mixed feed material until it is in the vicinity of the ring and ball formations.

Other objects of this invention will become apparent to those skilled in the art from the disclosures appearing hereinafter.

The invention provides an improved process for the thermal defluorination of phosphate rock by ammoniating the phosphoric acid fed as a portion of the feed mixture to the kiln, the amount of ammonia added being effective for forming a eutectic with the fused ring and ball materials. The feed mixture is heated, with agitation, to defluorinating temperatures for a period of time sufficient to defluorinate the phosphate rock.

Although specific embodiments of the processes of the present invention have been selected for illustration and description in the specification hereinafter, it will be appreciated by those skilled in the art that these are only examples which do not limit the scope of the invention which is defined in the appended claims.

DETAILED DESCRIPTION OF THE INVENTION

Figure 1:
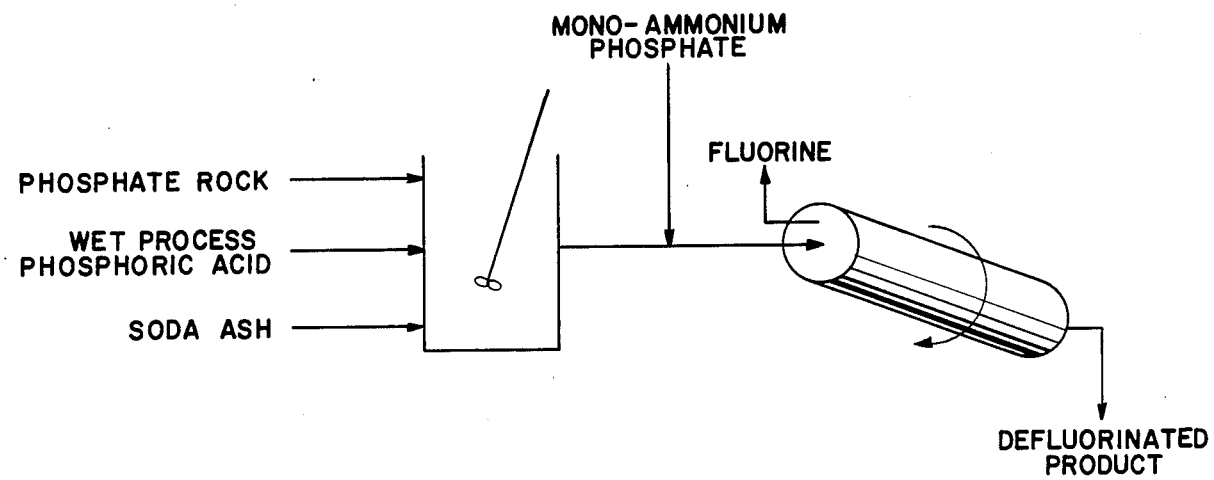
FIG. 1 is a schematic view of a prior art process.
Figure 2:
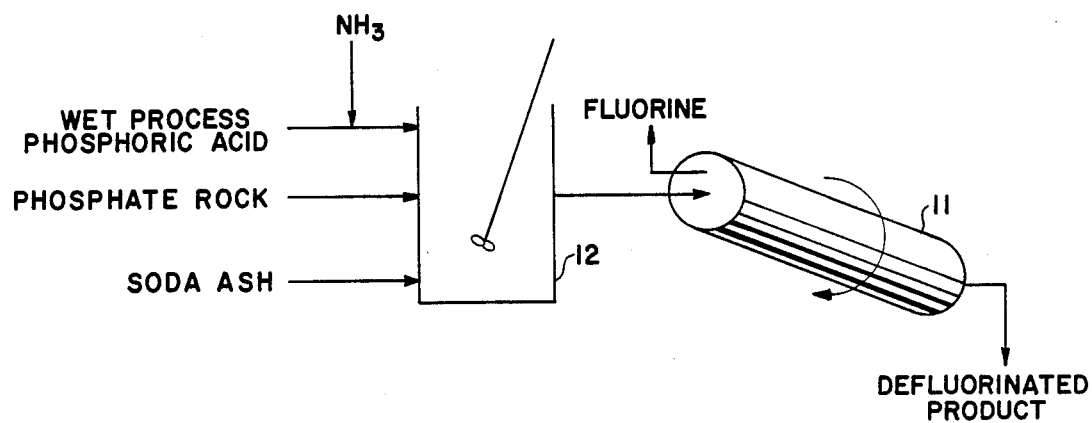
FIG. 2 is a schematic view of a process according to one embodiment of the present invention.

It has now been discovered that unexpected benefits are achieved by ammoniating the wet process phosphoric acid prior to, as shown schematically in FIG. 2, or at the time of, making the mixed feed which is later charged to the defluorination kiln 11. The unexpected results obtained by this method include greatly enhanced mixing, as evidenced by improved homogeneity of the mixed feed fed to the kiln 11, with fewer lumps, stratification and segregation, and by less variation in the chemical analysis of feed samples taken from the mixer 12 discharge.

As examples of the additives which may be used to ammoniate the phosphoric acid, there can be mentioned mono-ammonium phosphates and diammonium phosphates in any of numerous grades. In addition, ammonia, preferably in an anhydrous form or as an aqueous solution, can also be added to the phosphoric acid in the practice of the present invention.

The ammoniation can take place in any number of ways. Examples include adding a substantially dry solid ammonia-containing compound with the phosphate rock, prior to the introduction of the phosphoric acid into the mixer 12. Another example comprises sparging anhydrous ammonia directly into the mixer 12, concurrent with or subsequent to the addition of the phosphoric acid. A still further example comprises spraying or sparging aqueous ammonia into the mixer 12 prior to or concurrent with or even subsequent to the addition of the phosphoric acid to the mixer 12.

The amount of ammonia added to the wet process acid is preferably an amount sufficient to result in about a 75° F. temperature rise in the acid (the reaction between the acid and ammonia is exothermic). The mole ratio of added $NH_3:PO_4$ is preferably in the range of about 0.05:1 to 0.5:1, more preferably about 0.17:1.

The probable mechanism whereby ammoniated acid improves the mixed feed quality is believed to be as follows. Reaction rate is an extremely important aspect of the present invention. The amounts of phosphate rock and acid fed to the mixer are approximately 80 parts dry ingredients (rock and soda ash) and 20 parts wet ingredients (10 parts acid and 10 parts water). Thus, there is very little liquid acid to react with and coat the substantially solid mixture. Without the addition of ammonia, the phosphoric acid has a tendency to quickly react with the first particles of phosphate rock with which it contacts. This results in an inhomogenous feed containing small portions of highly reacted phosphate rock particles and large portions of totally unreacted (and uncoated) phosphate rock particles. By slowing down the reaction between the phosphoric acid and the phosphate rock, the acid has a longer time in which to become well mixed with the rock particles and to react more completely with the phosphate rock. The ammoniated acid is believed to reduce the reaction rate between the phosphoric acid and the rock. This allows the mixed feed to stay fluid for a longer period of time resulting in a more uniform mixing of the solid rock and the liquid phosphoric acid. Furthermore, more free phosphoric acid is left available to react with the soda ash (or other alkali-containing fluxing agent) when it is added to the mixer 12. The resultant mixed feed consists of individual granules of rock uniformly coated with consecutive layers of reacted rock, ammonium phosphate and sodium phosphate or soda ash. When this mixed feed enters the kiln 11, the ammonia is driven off starting at temperatures above 1000° F. This now makes phosphoric acid available to either react with the "glue phase" which forms at about the same temperature (and which contributes to the fusion of ball and ring materials), or to react with the soda ash or rock to form a continuous layer that separates the glue phase.

It is believed that the fusion of ball and ring materials occurs when unreacted phosphate rock particles come into contact with one another at high temperatures (i.e., in the kiln). The slower reactive process of the present invention ensures that much greater percentages of the phosphate rock particles are coated (i.e., reacted with) the phosphoric acid. These thin "reaction coatings" separate the rock particles and prevent fusing. Furthermore, the slower reactions of the present invention ensure that more phosphoric acid is available to dissolve the glue phase in any materials that do fuse.

The particular advantages of the present invention will become more apparent from the examples appearing hereinafter.

EXAMPLE 1

25 parts by weight of 46% $P_2O_5$ wet process phosphoric acid, 100 parts by weight of phosphate rock, 10 parts by weight of soda ash and ammonia were fed to a mixer. The ammonia was added until a calculated mole ratio of $NH_3:PO_4$ equal to 0.17:1 was reached. The mixed product was then fed to a rotary (2 RPM) defluorination kiln having a length of 225 feet and an inner diameter of 9 feet and operating within a temperature range of 1000°–3500° F. The optimal throughput of the defluorination kiln is determined to be 15 tons of feed per hour. Generally, a throughput of less than 10 tons per hour is considered poor and a throughput of less than 7 tons per hour is considered completely unacceptable. The kiln is designed to defluorinate a mixed feed containing phosphate rock having a silica content of less than 3.0%. For the purposes of Example 1, the feed of phosphate rock to the mixer was altered over a month long period. During this time, the ammoniated mixed feed was made with phosphate rock having an average of 3.5% $SiO_2$. When the ammoniated mixed feed was started, the kiln was restricted with rings and balls. After running on the ammoniated mixed feed for about 7 days, the ball and ring materials were completely dissolved and the feed rate was increased to 11.3 tons per hour where it remained for another 6 days. At the end of the month of testing, the kiln feed rate was 10.3 tons per hour. No significant ring or ball materials creating draft restrictions were observed.

COMPARATIVE EXAMPLE 1

Substantially the same test as described above in Example 1 was run except that no ammonia was added to the mixture. An 18 day test was run during which time the silica content of the phosphate rock averaged 3.5%. Severe ball and ring materials formed, impeding kiln throughput. During five of the 18 days, kiln throughput averaged less than or equal to 7 tons per hour. The average kiln throughput over the 18 day period was 8.01 tons per hour.

We claim:

1. In a process for thermal defluorination of a mixture of phosphate rock, wet process phosphoric acid and an alkali-containing fluxing agent by feeding said mixture to a thermal defluorination kiln adapted to receive said mixture, the method of preventing the formation of fused ring and ball materials comprising the steps of (1) ammoniating the wet process acid to provide a mole ratio of $NH_3:PO_4$ of from about 0.05 to 0.5 and (2) mixing the ammoniated acid with the rock and the fluxing agent prior to feeding the mixture to the kiln.

2. The method as defined in claim 1, wherein the phosphoric acid is ammoniated by adding monoammonium phosphate to the acid.

3. The method as defined in claim 1, wherein the phosphoric acid is ammoniated by adding diammonium phosphate to the acid.

4. The method as defined in claim 1, wherein the wet process phosphoric acid is ammoniated by sparging anhydrous ammonia through the acid.

5. The method as defined in claim 1 wherein the wet process acid is ammoniated by sparging aqueous ammonia through the acid.

6. The method as defined in claim 1, wherein the alkali-containing fluxing agent comprises soda ash.

7. The method as defined in claim 6, wherein the mole ratio is about 0.17:1.

* * * * *